(12) United States Patent
Huang et al.

(10) Patent No.: US 8,159,625 B2
(45) Date of Patent: Apr. 17, 2012

(54) LIQUID CRYSTAL DISPLAY AND ACTIVE MATRIX SUBSTRATE

(75) Inventors: Wei-Kai Huang, Hsinchu (TW);
Ying-Tsang Liu, Hsinchu (TW);
Chen-Shun Tsai, Hsinchu (TW);
Jeng-Shin Chen, Hsinchu (TW);
Yu-Chieh Lin, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 1192 days.

(21) Appl. No.: 11/556,193

(22) Filed: Nov. 3, 2006

(65) Prior Publication Data
US 2008/0055506 A1     Mar. 6, 2008

(30) Foreign Application Priority Data
Aug. 31, 2006  (TW) ............................. 95132144 A

(51) Int. Cl.
*G02F 1/1343*   (2006.01)
*G02F 1/136*    (2006.01)
*G02F 1/1337*   (2006.01)
(52) U.S. Cl. ............. 349/39; 349/38; 349/41; 349/129
(58) Field of Classification Search ............. 349/38–43, 349/139, 129
See application file for complete search history.

(56) References Cited

U.S. PATENT DOCUMENTS

| | | | |
|---|---|---|---|
| 6,958,791 B2 | 10/2005 | Shimoshikiryo | |
| 7,079,214 B2 | 7/2006 | Shimoshikiryo | |
| 7,518,687 B2* | 4/2009 | Chen et al. | 349/139 |
| 7,683,988 B2* | 3/2010 | Lin et al. | 349/114 |
| 2002/0101415 A1 | 8/2002 | Song | |
| 2003/0227429 A1 | 12/2003 | Shimoshikiryo | |

* cited by examiner

*Primary Examiner* — Dung T. Nguyen
(74) *Attorney, Agent, or Firm* — Jianq Chyun IP Office

(57) ABSTRACT

An active matrix substrate including a substrate, a plurality of scan lines, a plurality of data lines, a plurality of independent common line patterns, and a plurality of pixels is provided. The scan lines, data lines, and common line patterns are disposed on the substrate. The pixels are arranged in array on the substrate, wherein each pixel is electrically connected to corresponding scan line and data line, and the common line patterns are distributed under each pixel. Each pixel includes a plurality of active components and a plurality of pixel electrodes. Each of the pixel electrodes is electrically connected to corresponding scan line and data line through different active components. The capacitance coupling effect between each of the pixel electrodes and common line patterns are different. Additionally, an inspection method for the active matrix substrate and a liquid crystal display having the active matrix substrate are further provided.

24 Claims, 6 Drawing Sheets

LIQUID CRYSTAL DISPLAY AND ACTIVE MATRIX SUBSTRATE

CROSS-REFERENCE TO RELATED APPLICATION

This application claims the priority benefit of Taiwan application serial no. 95132144, filed Aug. 31, 2006. All disclosure of the Taiwan application is incorporated herein by reference.

BACKGROUND OF THE INVENTION

1. Field of Invention

The present invention relates to an inspection method. More particularly, the present invention relates to an inspection method capable of effectively inspecting the short defects between pixel electrodes in a single pixel.

2. Description of Related Art

Currently, TFT-LCDs (thin film transistor-liquid crystal display) with high contrast ratio, no gray scale inversion, high brightness, high color saturation, quick response, and wide viewing angle, etc are required by the market. The common wide viewing angle techniques includes TN with wide viewing film, in-plane switching (IPS) LCD, fringe field switching (FFS) LCD, and multi-domain vertical alignment (MVA) LCD. For example, the MVA LCD panel uses some alignment patterns, such as alignment protrusions or the slits to make liquid crystal molecules in each pixel being arranged in multi-direction, thereby obtaining multiple different aligned domains. The conventional MVA LCD panels, due to the alignment protrusions or slits formed on the color filter substrate or the TFT array substrate can make the liquid crystal molecules being arranged in multi-direction, thereby obtaining multiple different aligned domains, thus meeting the requirement for wide viewing angle. However, when viewing an image from different viewing angles, the color saturation of the image observed by users is different, which is referred to as color-shift.

SUMMARY OF THE INVENTION

Accordingly, the present invention is directed to provide an active matrix substrate having a plurality of independent common line patterns for performing inspection.

The present invention is also directed to provide an inspection method capable of effectively inspecting short defects between the pixel electrodes on the active matrix substrate.

The present invention is further directed to provide an LCD having a relatively high yield rate.

In order to achieve the above or other objectives, the present invention provides an active matrix substrate, which comprises a substrate, a plurality of scan lines, a plurality of data lines, a plurality of independent common line patterns, and a plurality of pixels. The scan lines, the data lines, and the common line patterns are disposed on the substrate, and the pixels are arranged in array on the substrate, wherein each pixel is electrically connected to corresponding scan line and data line, and the common line patterns are distributed under each pixel. Further, each pixel comprises a plurality of active components and a plurality of pixel electrodes. Each pixel electrode is electrically connected to corresponding scan line and data line through different active components, wherein the capacitance coupling effect between each pixel electrode and each common line pattern are different.

In an embodiment of the present invention, the common line patterns comprise a first common line pattern and a second common line pattern, wherein the first common line pattern and the second common line pattern are distributed under each pixel electrode.

In an embodiment of the present invention, the active components comprise a first TFT and a second TFT, and the pixel electrodes comprise a first pixel electrode electrically connected to the first TFT and a second pixel electrode electrically connected to the second TFT.

In an embodiment of the present invention, the channel width/length ratio of the first TFT is $W_1/L_1$, the channel width/length ratio of the second TFT is $W_2/L_2$, and $W1/L1 \neq W2/L2$. In an preferred embodiment of the present invention, $(W_1/L_1)/(W_2/L_2) \geq 2$.

In an embodiment of the present invention, each pixel further comprises a plurality of capacitor electrodes disposed between the common line patterns and the pixel electrodes, wherein the capacitor electrodes are electrically connected to corresponding pixel electrodes, and the pixel electrodes are coupled to the common line patterns through the capacitor electrodes, so as to form a plurality of storage capacitors.

In an embodiment of the present invention, the capacitor electrodes comprise a first capacitor electrode and a second capacitor electrode. The first capacitor electrode is disposed between the first common line pattern and the first pixel electrode, and is electrically connected to the first pixel electrode. The second capacitor electrode is disposed between the second common line pattern and the first pixel electrode, and is electrically connected to the first pixel electrode. Further, the capacitance of the storage capacitor constituted by the first capacitor electrode and the first common line pattern is C1, the capacitance of the storage capacitor constituted by the second capacitor electrode and the second common line pattern is C2, and C2>C1.

In an embodiment of the present invention, the capacitance of the storage capacitor constituted by the second pixel electrode and the second common line pattern is C3.

In an embodiment of the present invention, the capacitor electrodes further comprise a third capacitor electrode disposed between the first common line pattern and the second pixel electrode. The third capacitor electrode is electrically connected to the second pixel electrode, and the capacitance of the storage capacitor constituted by the third capacitor electrode and the first common line pattern is C4, and C4>C3.

In an embodiment of the present invention, each pixel further comprises a capacitor coupled line, wherein the capacitor coupled line is electrically connected to the first pixel electrode, and disposed under the second pixel electrode.

In an embodiment of the present invention, the pixel electrodes have a jagged edge.

In order to achieve the above or other objectives, the present invention provides an inspection method suitable for inspecting the above active matrix substrate. The inspection method comprises providing different voltage levels or wave patterns to each common line pattern, so as to increase the voltage difference between pixel electrodes in each pixel, and generating a short circuit determination according to the voltage difference.

In an embodiment of the present invention, when the quantity of the common line patterns is 2, the common line patterns are respectively coupled to a first voltage and a second voltage lower than the first voltage. In an embodiment of the present invention, the first voltage is, for example, a common voltage. In another embodiment of the present invention, the first voltage is higher than a common voltage, and the second voltage is higher than, equal to, or lower than the common voltage. In still another embodiment of the present invention, the first voltage is, for example, lower than common voltage.

In an embodiment of the present invention, when the quantity of the common line patterns is 3, the common line patterns are respectively coupled to a first voltage, a second voltage lower than the first voltage, and a third voltage lower than the second voltage. In an embodiment of the present invention, the first voltage is, for example, a common voltage. In another embodiment of the present invention, the first voltage is higher than the common voltage, the second voltage is higher than, equal to, or lower than the common voltage, and the third voltage is higher than, equal to, or lower than the common voltage. In still another embodiment of the present invention, the first voltage is, for example, lower than the common voltage.

In an embodiment of the present invention, the common voltage is, for example, between −50 V and 50 V. Moreover, the voltage difference between the first voltage and the second voltage is between 0 V and 100 V.

In an embodiment of the present invention, the inspection method further comprises charging the pixel electrodes, wherein the step of providing different voltage levels to each common line pattern is performed after the pixel electrodes are charged.

In order to achieve the above or other objectives, the present invention provides an LCD, which comprises the above active matrix substrate, an opposite substrate, a liquid crystal layer, and a control circuit board. The opposite substrate is disposed above the active matrix substrate, and the liquid crystal layer is disposed between the active matrix substrate and the opposite substrate, and the control circuit board is electrically connected to the active matrix substrate and the opposite substrate, wherein the independent common line patterns are electrically connected to each other through the control circuit board and are coupled to the common voltage.

In an embodiment of the present invention, the opposite substrate is a color filter substrate.

The present invention employs a plurality of independent common line patterns, so the defects in the active matrix substrate and the LCD of the present invention can be effectively inspected as the fabricating of the active matrix substrate is complete.

In order to the make aforementioned and other objectives, features and advantages of the present invention comprehensible, preferred embodiments accompanied with figures are described in detail below.

DESCRIPTION OF EMBODIMENTS

In manufacturing process of the TFT array substrate, after two pixel electrodes in a single pixel are patterned, the short defect of the two pixel electrodes may occur due to ITO residue, resulting in abnormal pixel display.

In order to overcome the above mentioned color-shift problem, many concepts dividing a single pixel into two different voltage areas are put forward one after another. Specifically, two pixel electrodes electrically insulated from each other are used in a single pixel, and the two pixel electrodes electrically insulated from each other are driven to have different voltages.

Figure 1:
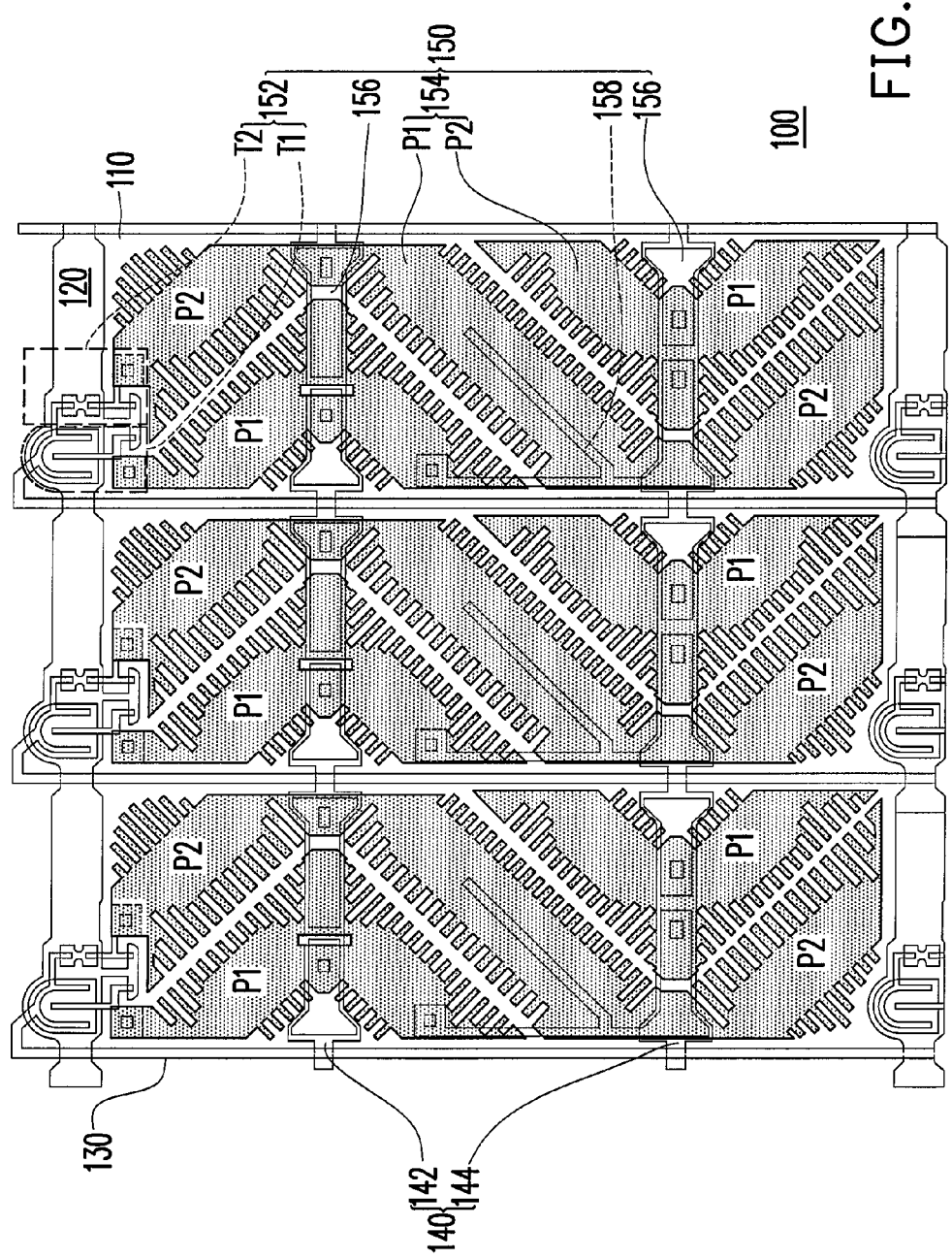
FIG. 1 is a top view of an active matrix substrate according to an embodiment of the present invention.

FIG. 1 is a top view of an active matrix substrate according to an embodiment of the present invention. Referring to FIG. 1, the active matrix substrate 100 of the present embodiment includes a substrate 110, a plurality of scan lines 120, a plurality of data lines 130, a plurality of independent common line patterns 140, and a plurality of pixels 150. The scan lines 120, the data lines 130, and the common line patterns 140 are all disposed on the substrate 110, and the pixels 150 are arranged in array on the substrate 110. As shown in FIG. 1, each pixel 150 is electrically connected to corresponding scan line 120 and data line 130, and the common line patterns 140 are distributed under each pixel 150. Moreover, each pixel 150 includes a plurality of active components 152 and a plurality of pixel electrodes 154. Each pixel electrode 154 is electrically connected to the corresponding scan line 120 and data line 130 through different active components 152, and the capacitance coupling effect between each pixel electrode 154 and different common line patterns 140 are different. It should be noted that when the capacitance coupling effect between each pixel electrode 154 and different common line patterns 140 are different, the abnormal short phenomenon between the pixel electrodes 154 in a same pixel 150 could be inspected in an array inspection stage. The details of the inspection mechanism are illustrated with reference to FIGS. 2A and 2B.

In this embodiment, the substrate 110 is, for example, a glass substrate, a plastic substrate, or another rigid substrate or flexible substrate. Generally speaking, the extending direction of the scan line 120 is, for example, perpendicular to the extending direction of the data line 130. Definitely, as the shape and arrangement manner such as strip arrangement, delta arrangement, and honeycomb arrangement of the pixels 150 are different, the present invention can adopt different types of scan lines 120 and data lines 130.

In the present invention, the quantity of the common line patterns 140, the active components 152, and the pixel electrodes 154 is two or more. In the following embodiment, mainly two common line patterns 140, two active components 152, and two pixel electrodes 154 are illustrated as examples, which are not intended to limit the present invention.

As shown in FIG. 1, the common line patterns 140 of this embodiment include a first common line pattern 142 and a second common line pattern 144, and the first common line pattern 142 and the second common line pattern 144 are distributed under each pixel 150. Specifically, as the first common line pattern 142 and the second common line pattern 144 on the active matrix substrate 100 are independent trace patterns, in the present invention, the first common line pattern 142 and the second common line pattern 144 can be coupled to different voltage levels respectively, so as to perform inspection on the pixels 150 of the active matrix substrate 100. Moreover, the active component 152 of this embodiment includes a first TFT T1 and a second TFT T2, and the pixel electrodes 154 include a first pixel electrode P1 electrically connected to the first TFT T1 and a second pixel electrode P2 electrically connected to the second TFT T2. Moreover, the pixel electrodes 154 of this embodiment (i.e.

the first pixel electrode P1 and the second pixel electrode P2) have a jagged edge, as shown in FIG. 1.

In order to improve the above-mentioned color shift problem, the channel width/length ratios of the first TFT T1 and the second TFT T2 are respectively designed to be $W_1/L_1$ and $W_2/L_2$ in this embodiment, and the channel width/length ratios of the first TFT T1 and the second TFT T2 are made to be different (i.e. $W_1/L_1 \neq W_2/L_2$). In a preferred embodiment, in order to obtain an enough difference between the channel width/length ratios of the first TFT T1 and the second TFT T2, usually the channel width/length ratios of the first TFT T1 and the second TFT T2 are made to meet the condition $(W_1/L_1)/(W_2/L_2) \geq 2$.

In this embodiment, each pixel 150 may further include a plurality of capacitor electrodes 156 disposed between the common line patterns 140 and the pixel electrodes 154, wherein the capacitor electrodes 156 are electrically connected to corresponding pixel electrodes 154, and the pixel electrodes 154 are coupled to the common line patterns 140 through the capacitor electrodes 156, so as to form a plurality of storage capacitors. As known from FIG. 1, the storage capacitors constituted by the capacitor electrodes 156 and the common line patterns 140 are of a metal-insulator-metal (MIM) architecture. However, it should be noted that the storage capacitors in the pixels 150 of the present invention could also employ a metal-insulator-ITO (MII) architecture. In other words, the capacitor electrodes 156 disclosed in this embodiment are optional elements.

In this embodiment, each pixel 150 further includes a capacitor coupled line 158, wherein the capacitor coupled line 158 is electrically connected to the first pixel electrode P1, and disposed under the second pixel electrode P2. It can be known from FIG. 1 that since the capacitor coupled line 158 is electrically connected to the first pixel electrode P1, and the voltage of the capacitor coupled line 158 and the voltage of the second pixel electrode P2 are different, the capacitor coupled line 158 affects the voltage of the second pixel electrode P2 because of a capacitance coupling effect. Specifically, during the time of turning on the first TFT T1 and the second TFT T2, the voltage of the second pixel electrode P2 is affected by the capacitor coupled line 158 and the second TFT T2 at the same time. During the time of turning off the first TFT T1 and the second TFT T2, the voltage of the second pixel electrode P2 is affected by 20 the capacitor coupled line 158. The relation of the capacitor coupled line 158 and the second pixel electrode P2 is as described in Taiwan Patent Application No. 94,116,051, the entire content of which is incorporated herein by reference.

Figure 2B:
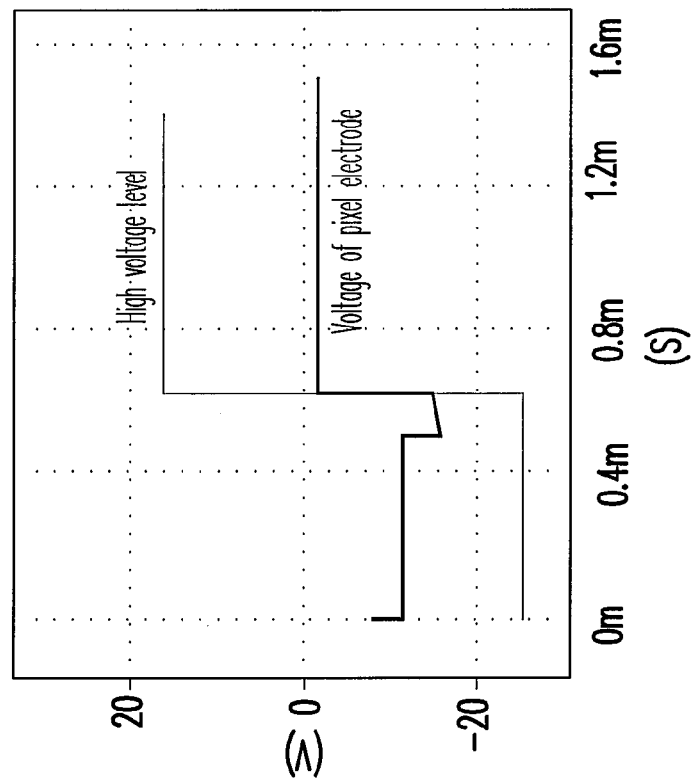
FIGS. 2A and 2B are schematic views of the common voltage and the voltage of the pixel electrode.
Figure 2A:
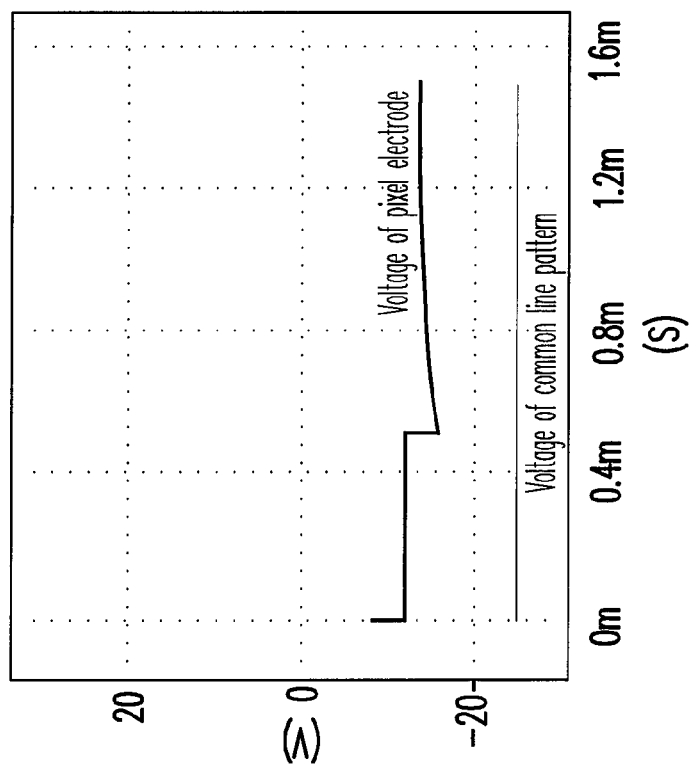

FIGS. 2A and 2B are schematic views of the common voltage and the voltage of the pixel electrode. Generally speaking, during the array inspection, the array inspection equipment can send out a gate pulse with a pulse width that is several times greater than that of a real panel, so as to ensure that most part of the defects can be inspected. Under the condition, the charging results of the two pixel electrodes in a single pixel are much more similar, so usually the abnormal short between two pixel electrodes cannot be inspected in the array inspection. The LCD panels fabricated by the TFT array substrate having defects have bright dot defects, which may result in the difficulty in manufacturing and the increase of cost, and also the grade of the fabricated LCD panels is declined. Referring to FIGS. 2A and 2B, as the current array inspection equipment cannot identify slight voltage difference, the present invention controls the voltage level coupled to the common line patterns to change the voltage of the pixel electrodes. When the voltage level coupled to the common line patterns remains at the same voltage level, the voltage of the pixel electrodes may not be influenced by the common line patterns to change (as shown in FIG. 2A). Otherwise, when the voltage level coupled to the common line patterns swings up to a high voltage level, the voltage of the pixel electrodes is affected by the common line patterns to rise (as shown in FIG. 2B). As shown in FIG. 2B, the voltage of the pixel electrodes may rise or fall along with the change of the voltage of the common line patterns.

Figure 3A:
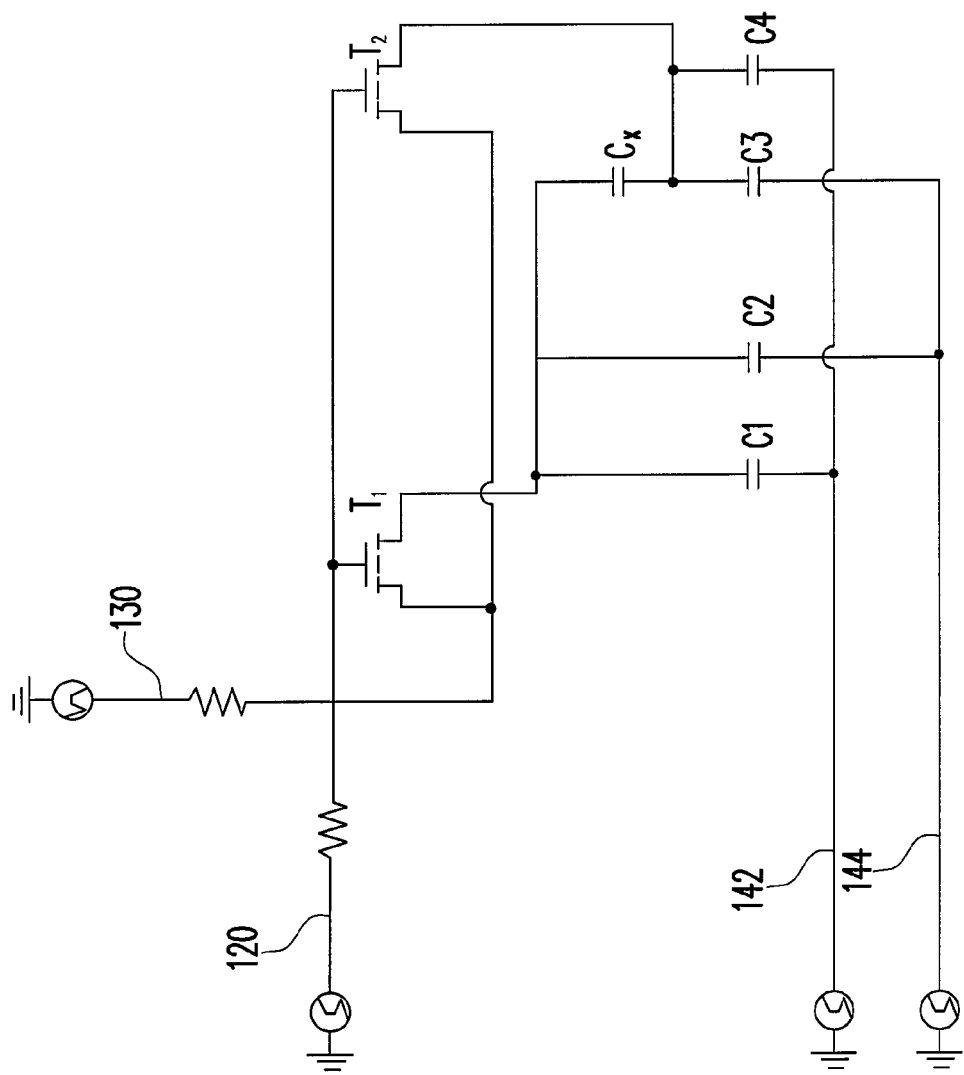
FIG. 3A is a circuit diagram of a single pixel according to an embodiment of the present invention.
Figure 3B:
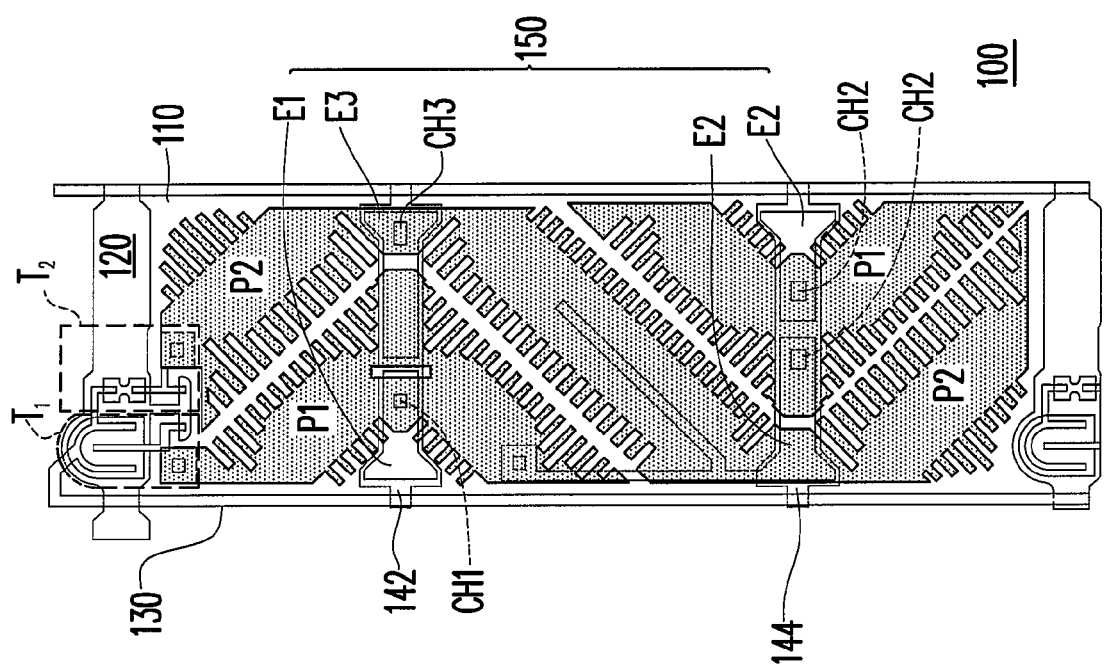
FIG. 3B is a top view of a single pixel according to an embodiment of the present invention.

FIG. 3A is a circuit diagram of a single pixel according to an embodiment of the present invention, and FIG. 3B is a top view of a single pixel according to an embodiment of the present invention. Referring to FIGS. 3A and 3B, the capacitor electrodes 156 of this embodiment include at least one first capacitor electrode E1 and at least one second capacitor electrode E2. The first capacitor electrode E1 is disposed between the first common line pattern 142 and the first pixel electrode P1, and is electrically connected to the first pixel electrode P1 via a contact window CH1. The second capacitor electrode E2 is disposed between the second common line pattern 144 and the first pixel electrode PI, and is electrically connected to the first pixel electrode P1 via a contact window CH2. Moreover, the capacitance of the storage capacitor constituted by the first capacitor electrode E1 and the first common line pattern 142 is C1, and the capacitance of the storage capacitor constituted by the second capacitor electrode E2 and the second common line pattern 144 is C2, and C2>C1.

Accordingly, the capacitance of the storage capacitor constituted by the second capacitor electrode P2 and the second common line pattern 144 is C3. Moreover, the capacitor electrodes 156 of this embodiment further include a third capacitor electrode E3 disposed between the first common line pattern 142 and the second pixel electrode P2. The third capacitor electrode E3 is electrically connected to the second pixel electrode P2 via a contact window CH3, and the capacitance of the storage capacitor constituted by the third capacitor electrode E3 and the first common line pattern 142 is C4, and C4>C3.

Figure 4:
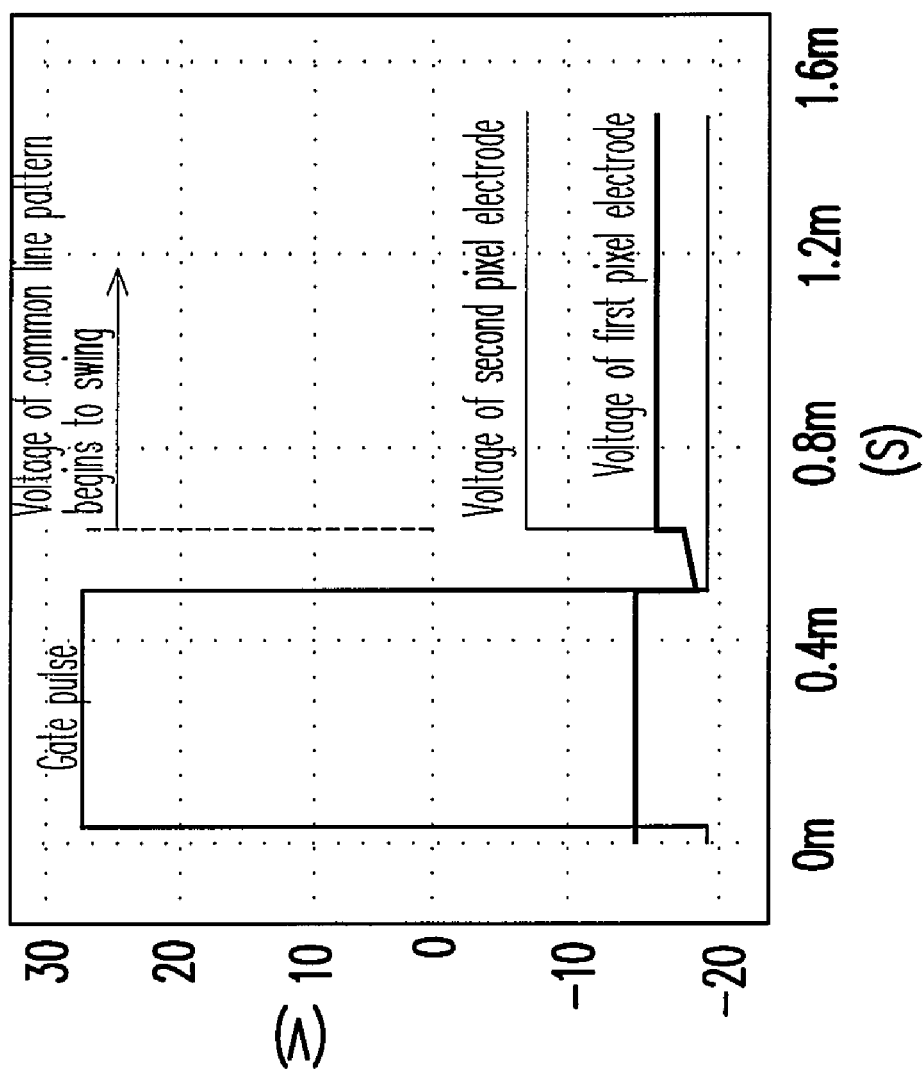
FIG. 4 is a schematic view of the voltage of the first pixel electrode and the second pixel electrode, when performing inspection on the pixel of FIG. 3B.

FIG. 4 is a schematic view of the voltage of the first pixel electrode and the second pixel electrode when performing inspection on the pixel of FIG. 3B. Referring to FIGS. 3B and 4, in order to increase the voltage difference between the first pixel electrode PI and the second pixel electrode P2, each common line pattern is provided with different voltage levels and/or wave patterns in the present invention, so as to increase the voltage difference between pixel electrodes (as shown in FIG. 4). Specifically, in this embodiment, a gate pulse is first transmitted though the scan line to turn on the first TFT T1 and the second TFT T2, and to charge the first pixel electrode PI and the second pixel electrode P2. After charging the first pixel electrode P1 and the second pixel electrode P2, the first TFT T1 and the second TFT T2 are turned off instantly. At this time, in this embodiment, the voltage coupled to the first common line pattern 142 is controlled to swing up to a first voltage, and the voltage coupled to the second common line pattern 144 is controlled to swing down to a second voltage lower than the first voltage. After the common line patterns are respectively coupled to different voltage levels (the first voltage and the second voltage), the voltage different between pixel electrodes is measured, and whether or not abnormal short exists between the pixel electrodes electrically insulated from each other is identified according to the measured voltage different.

In this embodiment, the first common line pattern 142 is applied with a first voltage, and the second common line pattern 144 is applied with a second voltage lower than the first voltage. The first voltage is, for example, the common voltage used in the normal operation of the display panel, and the second voltage is lower than the common voltage. Definitely, the present invention can also use the first voltage lower or higher than the common voltage. When the first voltage is higher than the common voltage, the second voltage can be higher than, equal to, or lower than the common voltage.

Referring to FIGS. 3B and 4, two common line patterns (142, 144) and two pixel electrodes (P1, P2) are illustrated as examples. However, the present invention is not limited to the quantity of the common line patterns and the pixel electrodes in a single pixel described above. For example, the quantity of the common line patterns and the pixel electrodes can also be 3. Under this circumstance, the common line patterns are, for example, coupled to a first voltage, a second voltage lower than the first voltage, and a third voltage lower than the second voltage. In an embodiment of the present invention, the first voltage is, for example, a common voltage. In another embodiment of the present invention, the first voltage is lower or higher than the common voltage. When the first voltage is higher than the common voltage, the second voltage can be higher than, equal to, or lower than the common voltage, and the third voltage can be higher than, equal to, or lower than the common voltage.

Figure 5:
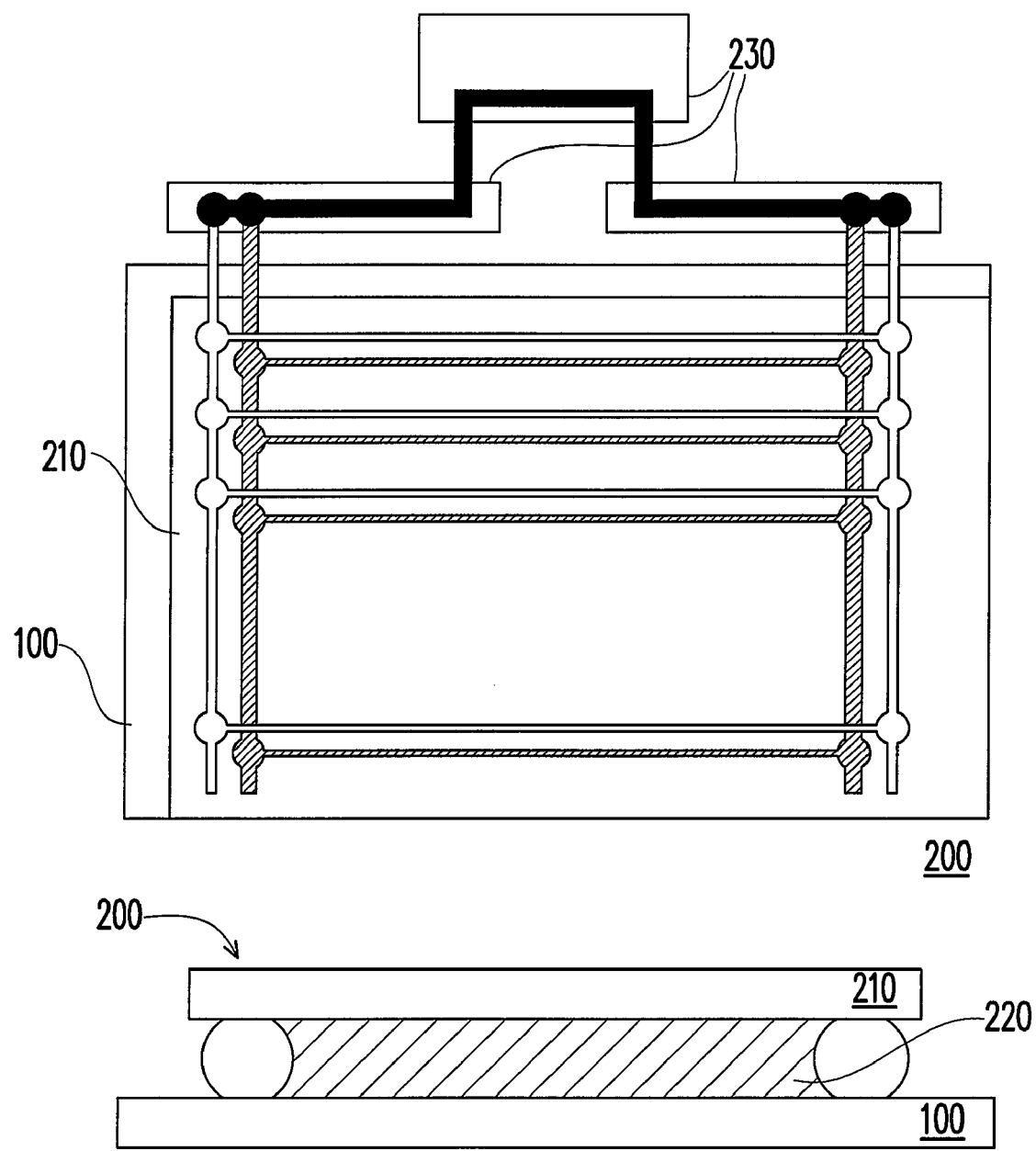
FIG. 5 is a schematic view of the LCD according to an embodiment of the present invention.

FIG. 5 is a schematic view of the LCD according to an embodiment of the present invention. Referring to FIG. 5, the LCD 200 of this embodiment includes the active matrix substrate 100, an opposite substrate 210 (e.g. a color filter substrate), a liquid crystal layer 220, and at least one control circuit board 230. The opposite substrate 210 is disposed above the active matrix substrate 100, the liquid crystal layer 220 is disposed between the active matrix substrate 100 and the opposite substrate 210, and the control circuit board 230 is electrically connected to the active matrix substrate 100 and the opposite substrate 220. It should be noted that the independent common line patterns 140 (e.g. the first common line pattern 142 and the second common line pattern 144) on the active matrix substrate 100 are electrically connected to each other through the control circuit board 230, and are coupled to the common voltage.

Since the present invention adopts a plurality of independent common line patterns, the defects in the active matrix substrate and the LCD of the present invention can be effectively inspected as the fabricating of the active matrix substrate is complete, thereby improving the yield rate, reducing the process cost, and improving the grade of the LCD panel.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active matrix substrate, comprising:
   a substrate;
   a plurality of scan lines, a plurality of data lines, and a plurality of common line patterns disposed on the substrate;
   a plurality of pixels arranged in array on the substrate, wherein each pixel is electrically connected to a single scan line and a single data line, and the common line patterns are distributed under each pixel, each the pixel comprising:
      a plurality of active components; and
      a plurality of pixel electrodes, wherein each of the pixel electrodes is electrically connected to the data line through different active components, and in each of the pixels, a capacitance coupling effect between one pixel electrode and one common line pattern is different from that between another pixel electrode and another common line pattern.

2. The active matrix substrate as claimed in claim 1, wherein the common line patterns comprise:
   a first common line pattern; and
   a second common line pattern, wherein the first common line pattern and the second common line pattern are distributed under the pixel electrodes.

3. The active matrix substrate as claimed in claim 2, wherein the active components comprise a first thin film transistor (TFT) and a second thin film transistor (TFT), and the pixel electrodes comprise a first pixel electrode electrically connected to the first TFT and a second pixel electrode electrically connected to the second TFT.

4. The active matrix substrate as claimed in claim 3, wherein a channel width/length ratio of the first TFT is $W_1/L_1$, a channel width/length ratio of the second TFT is $W_2/L_2$, and $W_1/L_1 \neq W_2/L_2$.

5. The active matrix substrate as claimed in claim 4, wherein $(W_1/L_1)/(W_2/L_2) \geq 2$.

6. The active matrix substrate as claimed in claim 3, wherein each pixel further comprises a plurality of capacitor electrodes disposed between the common line patterns and the pixel electrodes, wherein the capacitor electrodes are electrically connected to corresponding pixel electrodes, and the pixel electrodes are coupled to the common line patterns through the capacitor electrodes, so as to form a plurality of storage capacitors.

7. The active matrix substrate as claimed in claim 6, wherein the capacitor electrodes comprise:
   a first capacitor electrode disposed between the first common line pattern and the first pixel electrode, and electrically connected to the first pixel electrode; and
   a second capacitor electrode disposed between the second common line pattern and the first pixel electrode and electrically connected to the first pixel electrode, wherein a capacitance of the storage capacitor constituted by the first capacitor electrode and the first common line pattern is C1, a capacitance of the storage capacitor constituted by the second capacitor electrode and the second common line pattern is C2, and C2>C1.

8. The active matrix substrate as claimed in claim 7, wherein the capacitance of the storage capacitor constituted by the second pixel electrode and the second common line pattern is C3, and wherein the capacitor electrodes further comprise a third capacitor electrode disposed between the first common line pattern and the second pixel electrode and electrically connected to the second pixel electrode, a capacitance of the storage capacitor constituted by the third capacitor electrode and the first common line pattern is C4, and C4>C3.

9. The active matrix substrate as claimed in claim 6, wherein each pixel further comprises a capacitor coupled line, wherein the capacitor coupled line is electrically connected to the first pixel electrode and disposed under the second pixel electrode.

10. The active matrix substrate as claimed in claim 1, wherein the pixel electrodes have a jagged edge.

11. A liquid crystal display (LCD), comprising:
    the active matrix substrate of claim 1;
    an opposite substrate disposed above the active matrix substrate;
    a liquid crystal layer disposed between the active matrix substrate and the opposite substrate; and a control circuit board electrically connected to the active matrix substrate and the opposite substrate, wherein the common line patterns are electrically connected to each other through the control circuit board.

12. The liquid crystal display as claimed in claim 11, wherein the common line patterns comprise:
   a first common line pattern; and
   a second common line pattern, wherein the first common line pattern and the second common line pattern are distributed under the pixel electrodes.

13. The liquid crystal display as claimed in claim 12, wherein the active components comprise a first thin film transistor (TFT) and a second thin film transistor (TFT), and the pixel electrodes comprise a first pixel electrode electrically connected to the first TFT and a second pixel electrode electrically connected to the second TFT.

14. The liquid crystal display as claimed in claim 13, wherein a channel width/length ratio of the first TFT is $W_1/L_1$, a channel width/length ratio of the second TFT is $W_2/L_2$, and $(W_1/L_1)/(W_2/L_2) \geq 2$.

15. The liquid crystal display as claimed in claim 13, wherein each pixel further comprises a plurality of capacitor electrodes disposed between the common line patterns and the pixel electrodes, wherein the capacitor electrodes are electrically connected to corresponding pixel electrodes, and the pixel electrodes are coupled to the common line patterns through the capacitor electrodes, so as to form a plurality of storage capacitors.

16. The liquid crystal display as claimed in claim 15, wherein the capacitor electrodes comprise:
   a first capacitor electrode disposed between the first common line pattern and the first pixel electrode, and electrically connected to the first pixel electrode; and
   a second capacitor electrode disposed between the second common line pattern and the first pixel electrode and electrically connected to the first pixel electrode, wherein a capacitance of the storage capacitor constituted by the first capacitor electrode and the first common line pattern is C1, a capacitance of the storage capacitor constituted by the second capacitor electrode and the second common line pattern is C2, and C2>C1.

17. The liquid crystal display as claimed in claim 16, wherein the capacitance of the storage capacitor constituted by the second pixel electrode and the second common line pattern is C3, and wherein the capacitor electrodes further comprise a third capacitor electrode disposed between the first common line pattern and the second pixel electrode and electrically connected to the second pixel electrode, a capacitance of the storage capacitor constituted by the third capacitor electrode and the first common line pattern is C4, and C4>C3.

18. The active matrix substrate as claimed in claim 1, wherein the capacitance coupling effect between one pixel electrode and one common line pattern provided with a first voltage is different from that between another pixel electrode and another common line pattern provided with a second voltage different from the first voltage.

19. A pixel structure, electrically connected to a scan line and a data line, comprising:
   a plurality of active components electrically connected to the scan line and the data line;
   a plurality of pixel electrodes, each of which electrically connected to the data line through one of the active components; and
   a plurality of capacitor electrodes disposed under the pixel electrodes and between the pixel electrodes and a plurality of common line patterns coupled with different common voltages, wherein the capacitor electrodes are electrically connected to corresponding pixel electrodes, and the pixel electrodes are coupled to the common line patterns through the capacitor electrodes, so as to form a plurality of storage capacitors, and the capacitor electrodes comprise:
   a first capacitor electrode disposed between the first common line pattern and the first pixel electrode, and electrically connected to the first pixel electrode; and
   a second capacitor electrode disposed between the second common line pattern and the first pixel electrode and electrically connected to the first pixel electrode, wherein a capacitance of the storage capacitor constituted by the first capacitor electrode and the first common line pattern is C1, a capacitance of the storage capacitor constituted by the second capacitor electrode and the second common line pattern is C2, and C2>C1.

20. The pixel structure as claimed in claim 19, wherein the common line patterns comprise:
   a first common line pattern; and
   a second common line pattern, wherein the first common line pattern and the second common line pattern are distributed under the pixel electrodes.

21. The pixel structure as claimed in claim 19, wherein the active components comprise a first thin film transistor (TFT) and a second thin film transistor (TFT), and the pixel electrodes comprise a first pixel electrode electrically connected to the first TFT and a second pixel electrode electrically connected to the second TFT.

22. The liquid crystal display as claimed in claim 21, wherein a channel width/length ratio of the first TFT is $W_1/L_1$, a channel width/length ratio of the second TFT is $W_2/L_2$, and $(W_1/L_1)/(W_2/L_2) \geq 2$.

23. The pixel structure as claimed in claim 19, wherein the capacitance of the storage capacitor constituted by the second pixel electrode and the second common line pattern is C3, and wherein the capacitor electrodes further comprise a third capacitor electrode disposed between the first common line pattern and the second pixel electrode and electrically connected to the second pixel electrode, a capacitance of the storage capacitor constituted by the third capacitor electrode and the first common line pattern is C4, and C4>C3.

24. The pixel structure as claimed in claim 19, wherein the capacitance coupling effect between one pixel electrode and one common line pattern provided with a first voltage is different from that between another pixel electrode and another common line pattern provided with a second voltage different from the first voltage.

* * * * *